US007117371B1

(12) United States Patent
Parthasarathy et al.

(10) Patent No.: US 7,117,371 B1
(45) Date of Patent: Oct. 3, 2006

(54) SHARED NAMES (75) Inventors: Srivatsan Parthasarathy, Issaquah, WA (US); Steven J. Pratschner, Redmond, WA (US); Craig T. Sinclair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 09/605,602

(22) Filed: Jun. 28, 2000

(51) Int. Cl.
*G06F 12/14* (2006.01)
*G06F 9/445* (2006.01)
*G06F 9/455* (2006.01)

(52) U.S. Cl. ............... 713/187; 713/182; 713/189; 713/150; 713/155; 713/156; 713/170; 713/176; 380/30; 726/2; 717/167; 717/178

(58) Field of Classification Search ............... 713/189, 713/182, 200, 187, 150, 155, 156, 170, 176; 726/2; 717/167, 178; 380/30
See application file for complete search history.

(56) References Cited

U.S. PATENT DOCUMENTS

| 5,412,717 | A | * | 5/1995 | Fischer ..................... 713/156 |
| 5,432,852 | A | * | 7/1995 | Leighton et al. ............. 380/30 |
| 5,625,693 | A | | 4/1997 | Rohatgi et al. |
| 5,657,390 | A | | 8/1997 | Elgamal et al. |
| 5,689,565 | A | | 11/1997 | Spies et al. |
| 5,692,047 | A | | 11/1997 | McManis |
| 5,748,960 | A | | 5/1998 | Fischer |
| 5,757,915 | A | * | 5/1998 | Aucsmith et al. .......... 713/187 |
| 5,802,368 | A | | 9/1998 | Grigsby et al. |
| 5,805,899 | A | | 9/1998 | Evans et al. |
| 5,842,214 | A | | 11/1998 | Whitney et al. |
| 5,848,274 | A | | 12/1998 | Hamby et al. |
| 5,892,904 | A | | 4/1999 | Atkinson et al. |
| 5,924,094 | A | | 7/1999 | Sutter |
| 5,958,051 | A | | 9/1999 | Renaud et al. |
| 5,974,421 | A | | 10/1999 | Krishnaswamy et al. |
| 5,978,484 | A | | 11/1999 | Apperson et al. |
| 5,991,399 | A | | 11/1999 | Graunke et al. |
| 6,021,491 | A | | 2/2000 | Renaud |

(Continued)

FOREIGN PATENT DOCUMENTS

EP 0 849 658 A2 * 8/1997

(Continued)

OTHER PUBLICATIONS

IBM Digital Signature and RSA Private key Format, IBM Technical Disclosure Bulletin, vol. 39, iss. 12, pp. 9-16, Dec. 1996.*

(Continued)

*Primary Examiner*—Taghi T. Arani
(74) *Attorney, Agent, or Firm*—Amin & Turocy, LLP (57) ABSTRACT

A system and method is provided for providing security to components or assemblies employed by application programs during runtime. The present invention employs digital signature keys to ensure that an assembly name that is published is unique because the assembly is published with a publisher's public key. This prevents others from publishing an updated version of an assembly that claims to be published from the same publisher. The present invention guarantees name uniqueness and prevents name spoofing because the original publisher is the only one with the private key matching the public key related to a published assembly. Due to the fact that the public keys are stored in each reference, the caller can be assured that the assembly that the caller is binding to at runtime comes from the same publisher that owns the private key.

17 Claims, 10 Drawing Sheets

U.S. PATENT DOCUMENTS

| | | | |
|---|---|---|---|
| 6,044,467 A | 3/2000 | Gong | |
| 6,149,318 A | 11/2000 | Chase et al. | |
| 6,182,279 B1 | 1/2001 | Buxton | |
| 6,189,096 B1* | 2/2001 | Haverty | 713/155 |
| 6,212,673 B1 | 4/2001 | House et al. | |
| 6,230,184 B1 | 5/2001 | White et al. | |
| 6,263,379 B1 | 7/2001 | Atkinson et al. | |
| 6,308,320 B1 | 10/2001 | Burch | |
| 6,374,266 B1 | 4/2002 | Shnelvar | |
| 6,445,973 B1 | 9/2002 | Sagasaki et al. | |
| 6,463,535 B1* | 10/2002 | Drews | 713/176 |
| 6,480,880 B1 | 11/2002 | White et al. | |
| 6,510,516 B1 | 1/2003 | Benson et al. | |
| 6,560,706 B1* | 5/2003 | Carbajal et al. | 713/155 |
| 6,647,494 B1* | 11/2003 | Drews | 713/170 |
| 6,748,538 B1 | 6/2004 | Chan et al. | |
| 2002/0026634 A1 | 2/2002 | Shaw | |
| 2002/0129094 A1 | 9/2002 | Reisman | |

FOREIGN PATENT DOCUMENTS

| | | |
|---|---|---|
| EP | 0 845 733 A2 | 6/1998 |
| WO | WO 99/36854 | 7/1999 |
| WO | WO 00/08909 | 2/2000 |

OTHER PUBLICATIONS

Dominic Duggan, Type-based hot swapping of running modules, ACM SIGPLAN Notices, Proceedings of the sixth ACM SIGPLAN International conference on Functional programming ICFP '01, vol. 36, Iss. 10, Oct. 2001, pp. 62-73.*

C. Colby et al., A certifying compiler for Java, ACM SIGPLAN Notices, Proceedings of the ACM SIGPLAN 2000 conference on Programming language design and implementation PLDI '00, vol. 35, Iss. 5, May 2000, pp. 95-107.*

International Search Report related to PCT/US01/40634 mailed Dec. 23, 2002.

* cited by examiner

```
BOOL SharedNameKeyGen(
    // [in] desired key container name, must be a non-
empty string
    LPCWSTR         szKeyContainer,
    // [in] flag parameter, leave key installed is only
option
    DWORD           dwFlags,
    // [out] public/private key blob
    BYTE            **ppbKeyBlob,
    ULONG           *pcbKeyBlob)
```

Fig. 8a

```
BOOL SharedNameKeyInstall(
    // [in] desired key container name, must be a non-empty
    //string
    LPCWSTR         szKeyContainer,
    // [in] public/private key blob
    BYTE            *pbKeyBlob,
    ULONG           cbKeyBlob)
```

Fig. 8b

```
BOOL SharedNameKeyDelete(
    // [in] desired key container name
    LPCWSTR         szContainer)
```

Fig. 8c

```
VOID SharedNameFreeBuffer(
   // [in] pointer to memory to be freed
  BYTE      *pbMemory)
```

Fig. 8d

```
BOOL SharedNameGetPublicKey (
    // [in] desired key container name
    LPCWSTR         szContainer,
    // [in] public/private key blob (optional)
    BYTE            *pbKeyBlob,
    ULONG           cbKeyBlob
    // [out] public key blob
    BYTE            **ppbPublicKeyBlob,
    ULONG           *pcbPublicKeyBlob)
```

Fig. 9a

```
Struct {
    ALG_ID   SigAlgID;      // strong name signature algorithm
    ALG_ID   HashAlgID;     // strong name hash algorithm
    ULONG    cbPublicKey;   // length of the key in bytes
    BTYE[]   PublicKey;     // variable length byte array
                               containing the key value in format
                               output by CryptoAPI
} PublicKeyBlob;
```

Fig. 9b

```
BOOL SharedNameSignatureGeneration(
    // [in] valid path to the PE file for the Assembly
    LPCWSTR         szFilePath,
    // [in] name of key, if NULL will default to SharedNameKey
    LPCWSTR         szKeyContainer,
    // [in] public/private key blob (optional)
    BYTE            *pbKeyBlob,
    ULONG           cbKeyBlob
    // [in/out] signature blob
    BYTE            **ppbSignatureBlob,
    ULONG           *pcbSignatureBlob)
```

Fig. 9c

```
BOOL SharedNameTokenFromAssembly(
    // [in] valid path to the PE file for the Assembly
    LPCWSTR           szFilePath,
    // [out] strong name token
    BYTE              **ppbSharedNameToken,
    ULONG     *pcbSharedNameToken)
```

Fig. 10a

```
BOOL SharedNameTokenFromPublicKey(
    // [in] public key blob
    BYTE              *pbPublicKeyBlob,
    ULONG             cbPublicKeyBlob)
    // [out] strong name token
    BYTE              **ppbSharedNameToken,
    ULONG             *pcbSharedNameToken)
```

Fig. 10b

```
BOOL SharedNameSignatureVerification(
    // [in] valid path to the PE file for the Assembly
    LPCWSTR                szFilePath)
```

Fig. 10c

SHARED NAMES

TECHNICAL FIELD

The present invention relates to computer systems, and more particularly to a system and method for providing security to components employed by application programs at runtime.

BACKGROUND OF THE INVENTION

In the past, application programs consisted of a single monolithic binary file. Once a compiler generated the application program, the application program did not change until a next version was recompiled and shipped. Changes in an operating system, hardware and market demands were dependent on waiting for the next version to be implemented and recompiled. Today, application programs are comprised of several components—additionally, many of these components are linked at runtime. These components include dynamically linked libraries (DLLs) and other files that are shared by different application programs. These DLLs are listed within tables in application components to be linked at runtime. An operating system will search in a loader search path, application directory, operating system directory or user specified path for the name of the dynamic linked library, so that DLL code can be loaded into memory for execution. Since these DLLs can be shared by different application programs, changes to a DLL for one application may cause another application to stop operating.

Furthermore, many application programs running on operating systems, such as Microsoft® Windows® Operating System employ shared operating system components. One of the primary issues faced by administrators and developers on the current Microsoft® Windows® Operating System platform is the inability to control an exact set of dynamic link libraries and other files that will run as part of a deployed application program. It is quite common to have installation of one application program affect other application programs by overwriting files that those applications depend on. Unfortunately, there is no built in support in Microsoft® Windows® Operating System to detect when a file that an application depends on has changed.

In some situations, components may be changed and the application program may still choose to run if the integrity of the change can be trusted. For example, if a publisher of a component corrects a minor error in a component, the application program may still operate without a problem. Also, if a version upgrade has occurred by a trusted publisher, the application program may desire to accept a version upgrade and execute the component. However, if the component has been altered by an untrusted third party, execution of the code can result in damage to the software and hardware of the environment that the application program is operating on. Some codes include versioning information in the name of the component (e.g., foo1.dll, kernel2.dll). Since application programs reference these components by name, a change in the name will cause the application program to terminate its operation or use an old version of the component residing on the system.

Part of a component's identity is a simple, friendly textual name (e.g., My401kApp). These names are given to the component by the developer when the component is authored. These names are referred to as simple names. Simple names are not guaranteed to be unique and there is not any tool or anything in the runtime to prevent duplicate names from collisions. Simple names for components are easy and convenient to use and are sufficient in a number of situations. In particular, individual developers or small development shops do not have a need for a more sophisticated naming scheme. However, there are a number of situations where developers must be able to guarantee that the names they choose for their components will be globally unique. In COM, uniqueness is guaranteed by assigning a unique GUID to each component. However, GUIDs have a number of deficiencies. In particular, while GUIDs are unique when they are generated, nothing prevents another developer from later reusing the GUID and "substituting" their code in place of another's code.

Accordingly, there is an unmet need in the art for a system and method for ensuring and verifying integrity of components employed by application programs during runtime. There is also a need for a tool for verifying integrity of components at runtime. There is also a need for guaranteeing name uniqueness of these components and preventing name spoofing.

SUMMARY OF THE INVENTION

The present invention relates to a system and method of providing security and facilitating the integrity of components or assemblies (e.g., components including metadata), employed during runtime by application programs. The present invention employs cryptographic techniques to facilitate relationship between components. The present invention employs digital signature keys to ensure that an assembly name that is published is unique because the assembly is published with a publisher's public key. This prevents others from publishing an updated version of an assembly that claims to be published from the same publisher. The present invention guarantees name uniqueness and prevents name spoofing because the original publisher is the only one with the private key matching the public key related to a published assembly. Due to the fact that the public keys are stored in each reference, the caller can be assured that the assembly that the caller is binding to at runtime comes from the same publisher that owns the private key.

In many situations, application programs may choose to operate with assembly files that have been changed. For example, build revision changes may include modification of assembly files for correcting errors or bugs in the files. Application programs that require assemblies to have the same original behavior may not operate if a minor bug fix has occurred. Furthermore, application programs may choose to operate if major and minor revisions have occurred, if they are ensured that that they are getting an assembly from the publisher that the application program expects.

In one aspect of the invention, a public key becomes a part of a manifest or namespace of an assembly file. A hash is computed over the entire contents of the assembly. The hash is then encrypted using a private key match to the public key. The encrypted or encoded code can then stored at the end of the assembly file. Alternatively, a pointer to the encrypted or encoded code can be stored anywhere in the assembly prior to encryption. The encrypted or encoded code can then be stored in the memory location that the pointer references. Additionally, an assembly referencing the assembly file stores a token of the public key of the assembly file in a manifest or namespace of its own. The token is a reduced data set of a hashing of the public key. At runtime, the token is compared with the key in the target assembly to determine whether the target assembly came from the same publisher.

The verification of the signature is done at install time using the key stored in the manifest of the assembly that has been signed. This ensures that the target assembly comes from the publisher that is expected.

Each assembly's manifest is provided with identity information that contains a list of files that make up the assembly. Part of the information recorded about each file is a hash of the file's contents at the time the manifest was built. The hash is computed over the entire contents of the file. The code that emits the manifest is typically a compiler or a post-link tool, which may be responsible for computing the hash. The present invention may employ a secured hash algorithm (sha-1) in computing the hash. However, the present invention may employ a variety of hash algorithms in computing the hash. The file hashes can be verified when an assembly is installed into a global assembly cache and each time a file is loaded from a disk.

According to one aspect of the invention, a method is provided for facilitating a secured name space of an assembly employable by application programs during runtime. The method includes the steps of providing a key pair having a public key and a private key and providing the assembly with a manifest that contains the public key. The assembly is then hashed and the hash encrypted using the private key. The encrypted hash is then attached to the assembly.

In yet another aspect of the invention, a computer readable medium is provided having at least one computer executable component employable by an application program at runtime. The computer readable medium comprises an assembly including a manifest that contains a public key and a hash of the contents of the assembly encrypted by a private key matching the public key. The encrypted hash is attached to the assembly. The medium may further comprise a network In accordance with another aspect of the invention, a system is provided for facilitating secured name spaces of assemblies employable by application programs during runtime. The system comprises a first component adapted to provide a manifest within an assembly with a public key and a second component adapted to hash the contents of the assembly and encrypt the hash with a private key matching the public key.

Another aspect of the invention relates to a system for facilitating a secured name space of an assembly employable by application programs during runtime. The system comprises means for providing a key pair having a public key and a private key, means for inserting a public key in a manifest of an assembly, means for hashing the assembly, means for encrypting the hash of the assembly with the private key and means for relating the encrypted hash to the assembly.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. The present invention is described with reference to a system and method for facilitating integrity of components employed by application programs during runtime. These components are typically dynamically linked libraries (DLLs), but also could include definition files, declaration files and executable files linked to an application program at runtime. An assembly according to at least one aspect of the subject invention is herein defined as components that include metadata describing the assembly or describing the assemblies that an assembly depends on. The present invention employs cryptographic techniques, such as hashing and digital signatures, to create secure assemblies for use with application programs. The present invention utilizes digital encryption and signing techniques. The present invention utilizes public-key cryptography techniques, such as described in Schneier, Bruce; Applied Cryptography Second Edition: Protocols, Algorithms, and Source Code in C; New York: John Wiley & Sons, 1996, which is hereby incorporated by reference. The present invention utilizes the RSA (Rivest, Shamir and Adlemen) public key algorithm for digital signatures, in conjunction with a hashing algorithm referred to as SHA (secured hash algorithm), although other public-key signature schemes can be employed. The basic concept of public-key cryptography is that every developer will be given a key pair that includes both a private key and a public key. A key may be an algorithm that receives the bits of a file and generates a numerical sequence from the bits in the file. The private key is a unique key assigned to the developer and is intended to be kept secret by the developer. The public key is typically made available to other developers or users. The public key may be used to verify that the digital signature on a received data file is authentic (e.g., that the digital signature was created with the private key). A file may be encrypted with a private key and a public key used to decode the encryption. The present invention provides an RSA-encrypted SHA-hash of a top assembly file of an assembly and a public key stored in the metadata of the top assembly to verify the integrity of the assembly.

The present invention also solves the problem of name uniqueness and name security at runtime using standard public-key cryptography. Names secured with a key-pair are termed shared names. In particular, shared names guarantee name uniqueness by relying on unique key-pairs and preventing others from "taking over the namespace", because only a developer of an assembly has a private key to the assembly, such that no one can generate the same name to another assembly.

Figure 1:
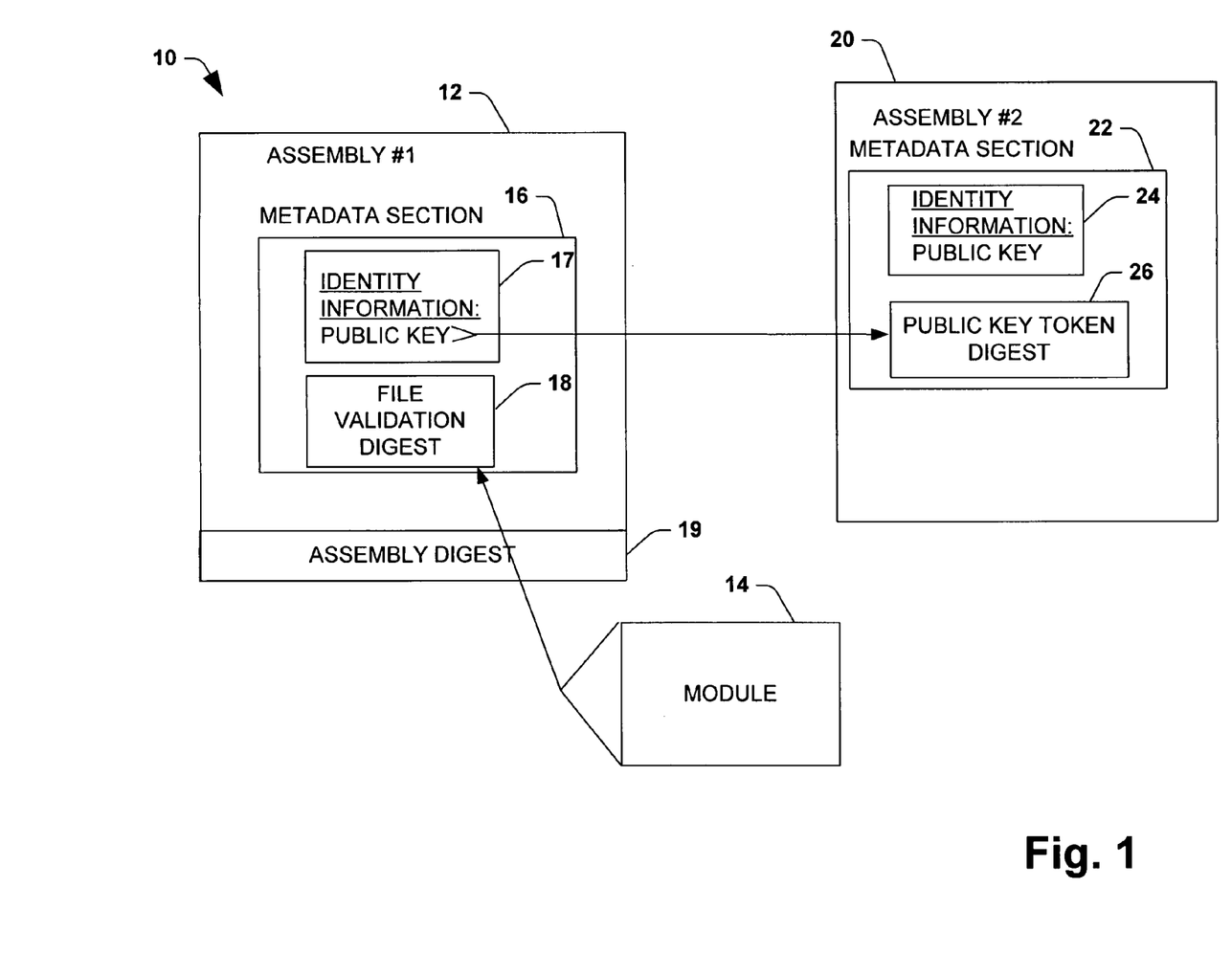
FIG. 1 illustrates a block diagram of an assembly referencing an assembly having multiple modules in accordance with one aspect of the present invention.

FIG. 1 illustrates relationships of assemblies and the use of encryption with digital signatures according to the present invention. A first assembly 10 includes a top assembly 12 and a module 14. A metadata section 16 is provided in the top assembly 12 that includes information regarding the first assembly 10. The metadata section 16 includes an identity information component 17 and a file validation digest component 18. The identity information component 17 includes information about the first assembly 10, while the file validation digest component 18 includes information about the module 14. The identity information component 17 can include publishing information, a public key, version information, operating system information in addition to many other types of information about the first assembly 10. The public key forms a portion of an assembly's name that can be verified at runtime. The file validation digest component 18 may include a hash of the module 14. The information in the identity information component 17 and the file validation digest component 18 can be used prior to runtime or at runtime to verify that the assembly has not been modified. An assembly digest 19 is provided at the end of the top assembly 12. The top assembly digest 19 may contain a hash of the contents of the top assembly 12. The top assembly hash is then encrypted using a private key that matches the public key located in the identity information component 17. The encrypted hash can be used to verify that the contents of the top assembly 12 have not been modified, while the hash in the file validation digest component 18 can be used to verify that the module 14 has not been modified.

It is to be appreciated that most application programs are comprised of several assemblies, some of which refer to other assemblies while executing. Therefore, FIG. 1 also illustrates a second assembly 20 being provided that depends on or references the first assembly 10. A metadata section 22 is provided in the second assembly 20 that includes information regarding the second assembly 20, and also information about the first assembly 10, which it references during runtime. The metadata section 22 includes an identity information component 24 and a public key token digest component 26. The identity information component 24 includes information about the second assembly 20, while the reference validation digest component 26 includes information about the first assembly 10. The identity information component 24 can include publishing information, a public key, version information, operating system information in addition to many other types of information about the second assembly 20.

The public key token digest component 26 includes a reduced hash of the public key of the first assembly 10. Typically, a hash using the secured hash algorithm (sha-1) is a 160-bit word. The present invention employs the first 64 bits or 8 bytes of the hash to verify the public key of the first assembly 10 matches the public key token stored in the second assembly 20. The information in the public key token digest component 26 can be used prior to runtime or at runtime to verify that the second assembly 20 came from the publisher that is expected (e.g., the owner of the private key). Therefore, if the first 64 bits of the public key in the information component 17 matches the public key token in the public key token digest 26, there is some level of certainty that the first assembly 10 does come from the owner of the private key that matches the public key.

Figure 2:
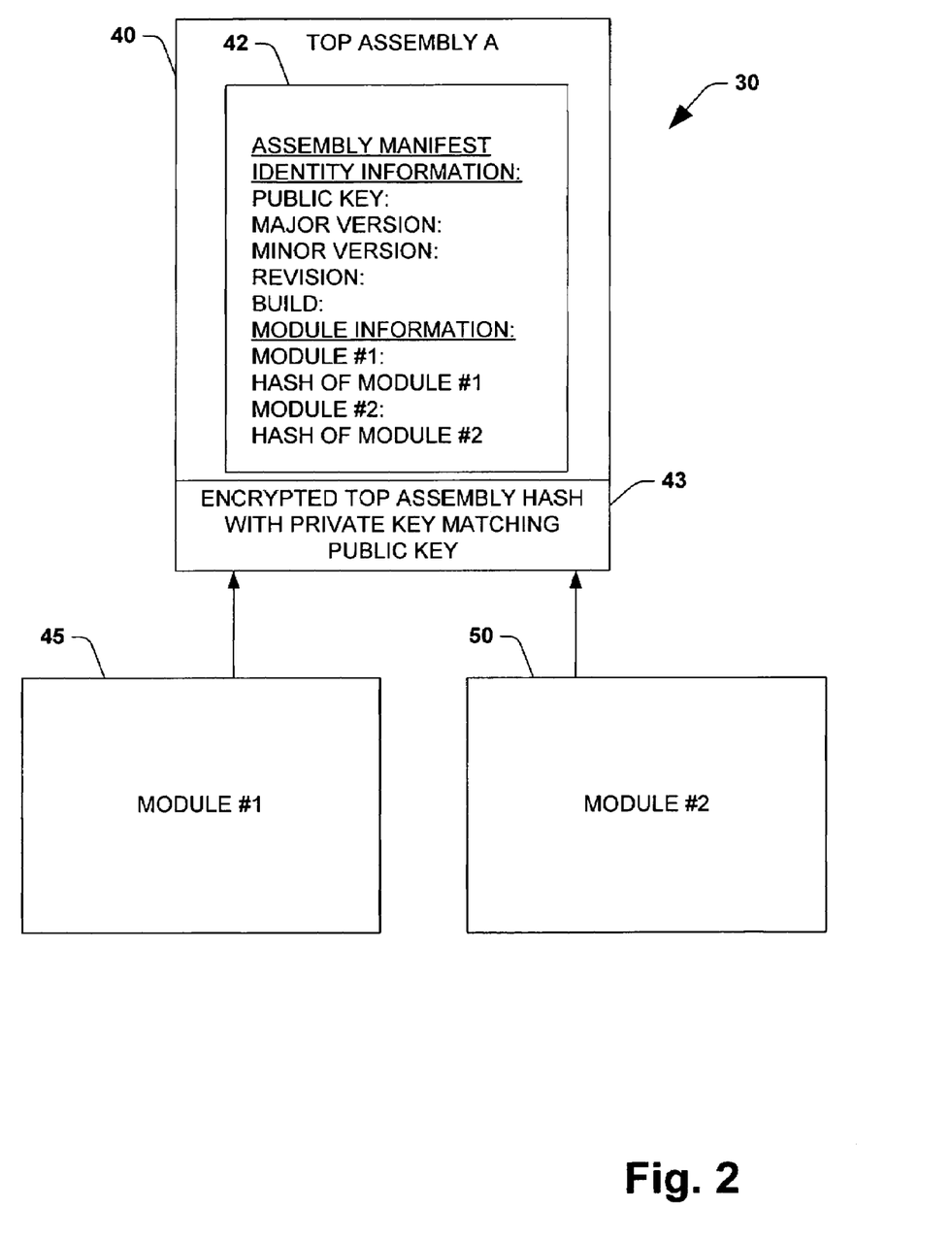
FIG. 2 illustrates a detailed block diagram of an assembly having multiple modules in accordance with one aspect of the present invention.

FIG. 2 illustrates the composition of an assembly in more detail according to the present invention. An assembly 30 is comprised of a top assembly 40, a first module 45 and a second module 50. The top assembly 40 includes a metadata section 42 referred to as an assembly manifest. The assembly manifest 42 includes identity information such as the following: public key, major version, minor version, revision, build and module information. Other information can be placed in the identity information (e.g., operating system, locale). The module information is a list of the modules making up the assembly 30 and the hash of the file contents of each module. Prior to or at runtime, the file hash and the module hashes can be checked against the actual hashes of the first module 45 and the second module 50, using the same hash algorithm, to determine the integrity of the assembly 30. The top assembly 40 includes a top assembly hash 43 located at the end of the file. The top assembly hash is encrypted with a developer's private key that matches the public key in the identity information. The public key in the identity information can be employed to decode the encrypted top assembly hash 43 into a hash that can be compared to an actual hash of the remaining file contents. It can then be determined if any changes have occurred in the top assembly 40 by an unauthorized source. If the assembly 30 has changed, the application program calling the assembly 30 can choose to automatically abort.

Figure 3:
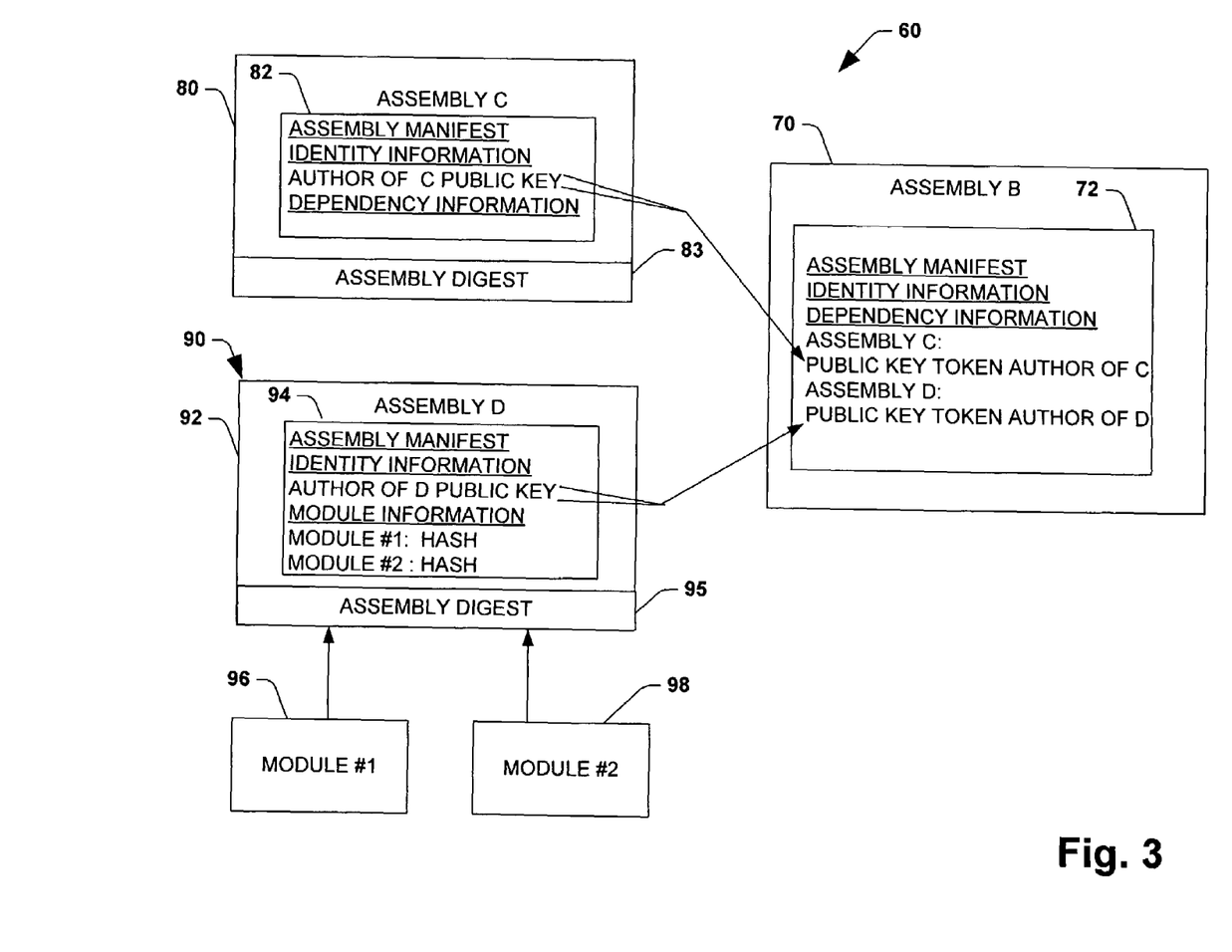
FIG. 3 illustrates a detailed block diagram of an assembly referencing multiple assemblies in accordance with one aspect of the present invention.

FIG. 3 illustrates the composition of an assembly that references another assembly in more detail according to the present invention. A referencing assembly 70, labeled assembly B, references a first referenced assembly 80, labeled assembly C, and a second referenced assembly 90, labeled as assembly D. The referencing assembly 70 includes an assembly manifest 72 having identity information similar to the identity information of top assembly 40 described in FIG. 2. The assembly manifest 72 also includes dependency information that includes a list of assemblies that the referencing assembly 70 depends on during execution. The list of assemblies also includes a public key token for each assembly, which is a reduced hash of the public key in the referenced assembly's manifest. The first referenced assembly 80 has an assembly manifest 82 including both identity and dependency information and an assembly digest 83. The presence of dependency information informs the application program that the first referenced assembly 80 also depends from at least one other assembly (not shown). The first referenced assembly 80 does not have any modules and therefore the identity information does not include hashes for any modules.

The second referenced assembly 90 has an assembly manifest 94 that includes identity informaton, but does not have any dependency information. Therefore, the second referenced assembly 90 does not depend on any other assemblies to execute. The second referenced assembly 90 is comprised of a top assembly 92, a first module 96 and a second module 98. The identity informaton includes a list of the modules of the assembly 90 and the hash of the entire contents of each module. An assembly digest 95 is provided at the end of the top assembly 92. The assembly digest includes a hash of the remaining file contents of top assembly 92. The hash is encrypted by a private key of an author of the assembly. The private key and the public key in the assembly manifest 94 form a key pair that have a unique mathematical relationship. The entire contents of assemblies 70, 80 and 90 can be loaded into a cache of a computer system at runtime and the public key tokens in the referencing assemblies used to verify the public keys in the referenced assemblies. The encrypted hash in the assembly digest can be decoded using the public keys in the assembly manifest and then compared with hashes run on the top assemblies to verify that the assemblies have not been tampered with.

Figure 4:
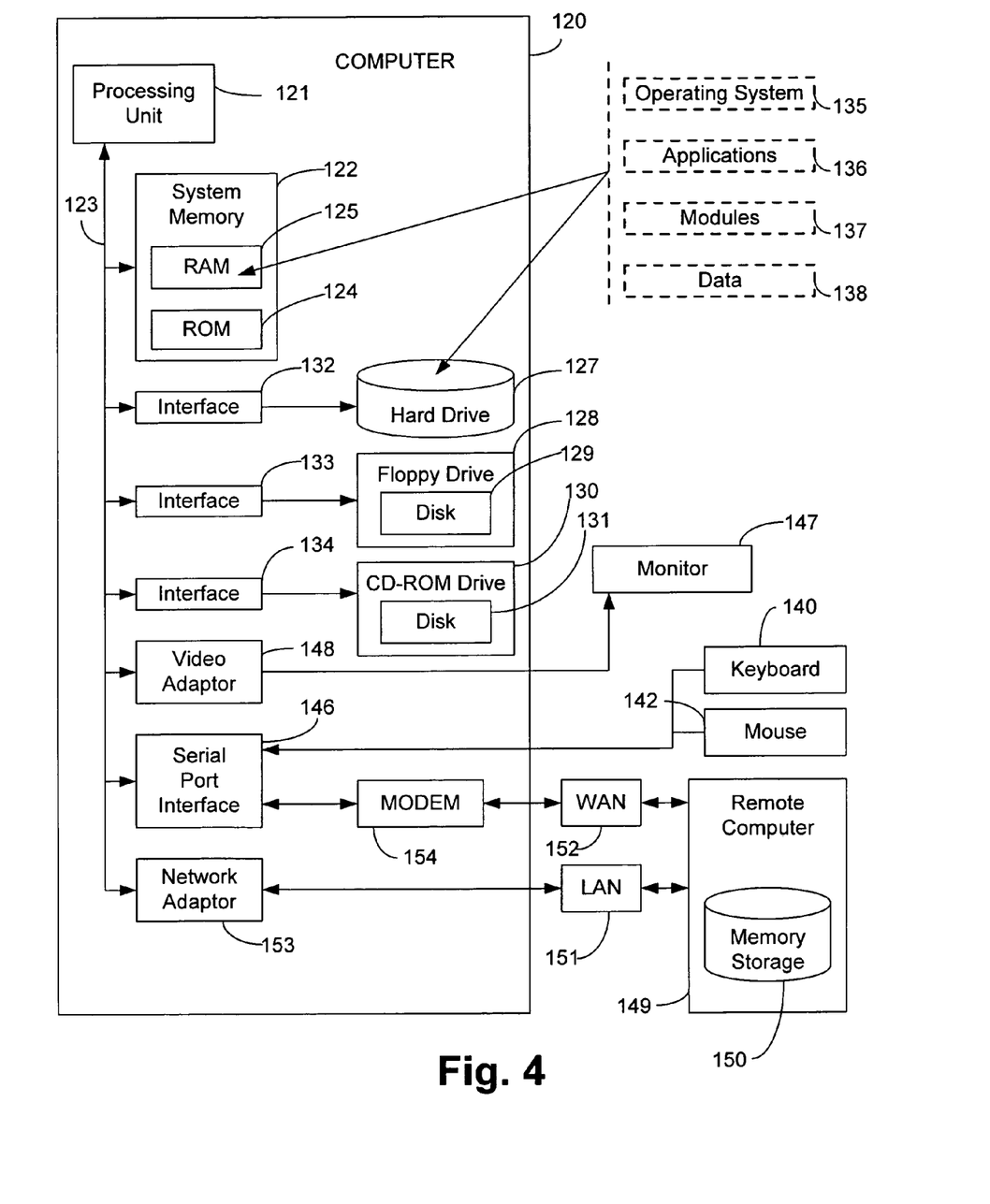
FIG. 4 illustrates a block diagram of a computer system in accordance with an environment of the present invention.

FIG. 4 and the following discussion are intended to provide a brief, general description of a suitable computing environment in which the invention may be implemented. While the invention will be described in the general context of computer-executable instructions of a computer program that runs on a personal or server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 4, an exemplary system for implementing the invention includes a conventional personal or server computer 120, including a processing unit 121, a system memory 122, and a system bus 123 that couples various system components including the system memory to the processing unit 121. The processing unit may be any of various commercially available processors, including Intel x86, Pentium and compatible microprocessors from Intel and others, including Cyrix, AMD and Nexgen; Alpha from Digital; MISS from MIPS Technology, NEC, IDT, Siemens, and others; and the PowerPC from IBM and Motorola. Dual microprocessors and other multi-processor architectures also can be used as the processing unit 121.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 124 and random access memory (RAM) 125. A basic input/output system (BIOS), containing the basic routines that help to transfer information between elements within the computer 120, such as during start-up, is stored in ROM 124.

The computer 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions, etc. for the server computer 120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 125, including an operating system 135, one or more application programs 136, other program modules 137, and program data 138. The operating system 135 in the illustrated computer can be Microsoft Windows NT Server operating system, together with the before mentioned Microsoft Transaction Server, Microsoft Windows 95, Microsoft Windows 98 or Microsoft Windows 2000.

A user may enter commands and information into the computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, computers typically include other peripheral output devices (not shown), such as speakers and printers.

The computer 120 may operate in a networked environment using logical connections to one or more remote computers, such as a remote server or client computer 149. The remote computer 149 may be a workstation, a server computer, a router, a peer device or other common network node, and typically includes many or all of the elements described relative to the computer 120, although only a memory storage device 150 has been illustrated in FIG. 4. The logical connections depicted in FIG. 4 include a local area network (LAN) 151 and a wide area network (WAN) 152. Such networking environments are commonplace in offices, enterprise-wide computer networks, intranets and the Internet.

When used in a LAN networking environment, the computer 120 is connected to the local network 151 through a network interface or adapter 153. When used in a WAN networking environment, the server computer 120 typically includes a modem 154, or is connected to a communications server on the LAN, or has other means for establishing communications over the wide area network 152, such as the Internet. The modem 154, which may be internal or external, is connected to the system bus 123 via the serial port interface 146. In a networked environment, program modules depicted relative to the computer 320, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 120, unless indicated otherwise. Such acts and operations are sometimes referred to as being computer-executed. It will be appreciated that the acts and symbolically represented operations include the manipulation by the processing unit 121 of electrical signals representing data bits which causes a resulting transformation or reduction of the electrical signal representation, and the maintenance of data bits at memory locations in the memory system (including the system memory 122, hard drive 127, floppy disks 129, and CD-ROM 131) to thereby reconfigure or otherwise alter the computer system's operation, as well as other processing of signals. The memory locations where data bits are maintained are physical locations that have particular electrical, magnetic, or optical properties corresponding to the data bits.

Figure 5:
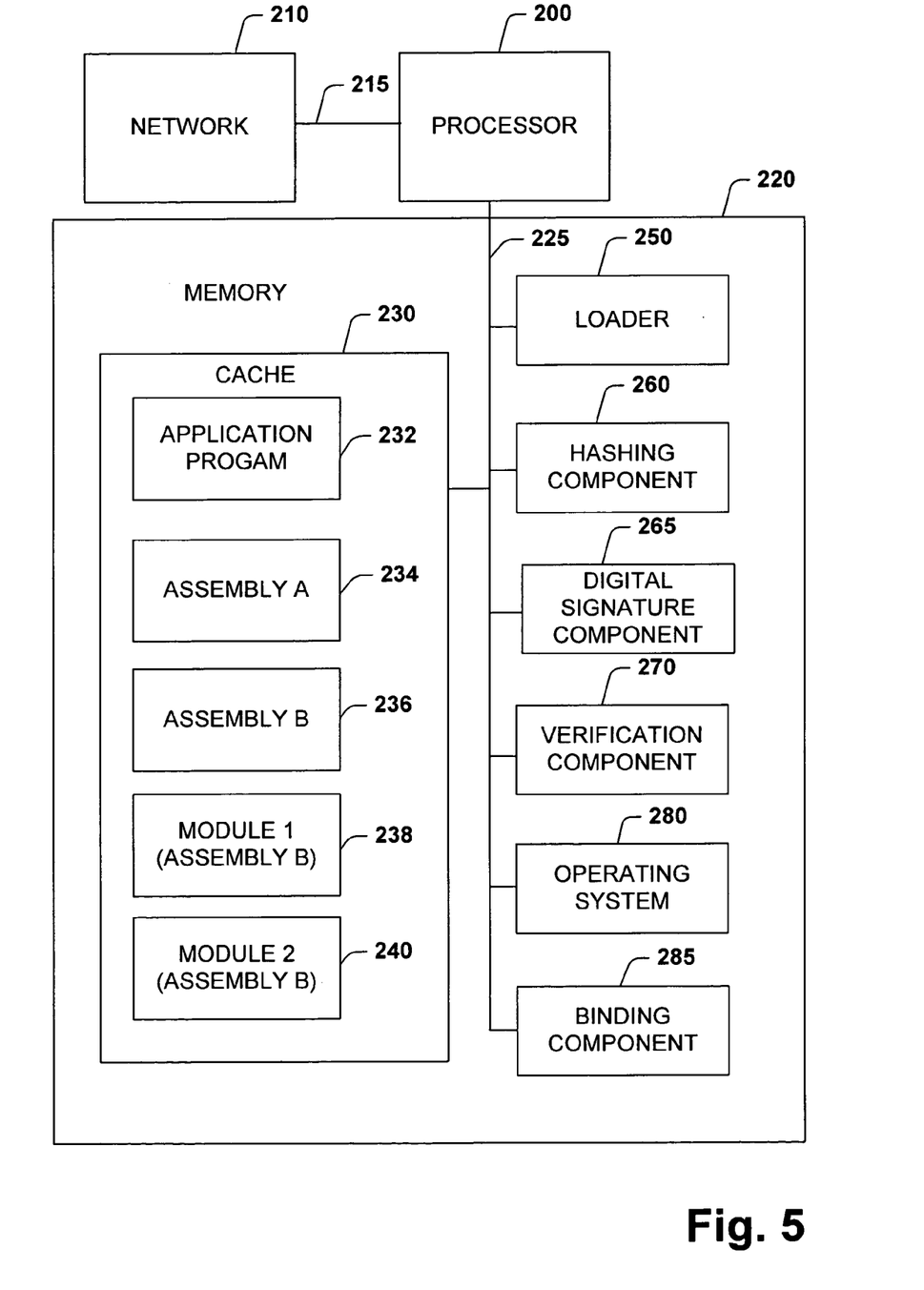
FIG. 5 illustrates a detailed block diagram of an environment in accordance with the present invention.

FIG. 5 illustrates a more detailed environment with respect to the present invention. A processor 200 is coupled to a memory medium 220 through a bus 225. The processor is also coupled to a network 210 through a network line 215. The network 210 allows for the processor to retrieve and send assemblies and other components with other remote computers. The memory medium 220 includes a cache memory 230 separate from the remaining portions of the memory. The cache memory 230 is where the application program 232 executes. It is to be appreciated that the remaining memory can be a secondary cache, ROM, RAM, or some fixed or floppy disk medium. A hashing component 260 resides on the memory medium 220 for inserting hashes of assemblies during the development stage of the assemblies. However, the hashing component 260 could insert the hashes during an initial deployment and testing of the application programs and assemblies or by an administrator at a later time. A digital signature component 265 provides key pairs for use in creating assemblies. The digital signature component 265 can also insert a public key into the manifest of an assembly under development. The digital signature component 265 employs the hashing component 260 in hashing the contents of an assembly and then encrypts the hash with a private key that is part of a key pair with the public key stored in the manifest of the assembly. The hashing component 260 and the digital signature component 265 are can be an application program interface (API) that resides as part of an operating system 275. However, the hashing component 260 and the digital signature component 265 can be part of the application program 232. Furthermore, the hashing component 260 and the digital signature component 265 may be comprised of a number of different components, for example, separate components for the hash, versioning, key pair creation and insertion functions.

The application program 232 is deployed and loaded into the cache 230. The application program 232 communicates to a loader 250, which locates the assemblies specified by the application program 232 to be used by the application program 232 at runtime and loads these assemblies into the cache 230. In the present example, a first assembly 234, labeled assembly A, and a second assembly 236, labeled assembly B, are loaded into the cache 230. The second assembly 236 includes a first module 238 and a second module 240 that are also loaded into the cache 230. The first assembly 234 and the second assembly 236 may reside as shared assemblies that are part of the operating system 275, may reside as libraries on a remote computer, may reside in a directory as part of the application program 232 or within another application program.

A binding component 280 also resides in the memory medium 220. The binding component 280 provides a binding policy and is used to manage the applications that deal with shared assemblies. The binding component 280 can make decision of whether to bind to an original, upgraded or standardized version of assemblies. For, example, the first assembly 234 and the second assembly 236 can have the same assembly name where the second assembly 236 is an updated version of the first assembly 234. Furthermore, both assemblies may be loaded into the cache 230 by the loader 250. The binding component 280 can then determine whether or not the application program 232 should bind to the first assembly 234 or the second assembly 236 based on a binding policy defined in the binding component 280. The binding component 280 may allow for assemblies with the same name to reside side by side within a system and may give, the application program 232, a developer or an administrator, the ability to control the decision making on what is the appropriate binding policy to follow.

A verification component 270 resides on memory medium 220. The verification component is invoked to read the manifests within the assemblies, compare key values with key tokens, decode encrypted hashes using the public keys and call the hash algorithm used to hash the assemblies. The verification component 270 then compares the decoded encrypted hashes on the assemblies with actual hashes run on the assemblies. The verification component 270 can then communicate to the application program 232 whether or not the author of the assembly is the private key owner or whether or not any changes have occurred with the assemblies. The verification component 270 can then decide whether or not to check version and publisher information based on the binding policy set by the binding component 280. In an alternate aspect of the invention, the verification component retains a table of digital signatures and hashes of the assemblies employed during initial deployment and testing of the application program. The verification component can then run hashes on the assemblies and compare the hashes with the hashes found in the tables. The verifying component 270 can be an application program interface (API) that resides as part of an operating system 275 or can be part of the application program 232.

It is to be appreciated that the above example of components were depicted as being separate for illustrative purposes only. It is to be understood that various components can be integrated within other components while still maintaining the functionality described above. Furthermore, the above description is an example of how the components can interact to carry out the present invention and other examples may be employed to carry out the present invention.

Figure 6:
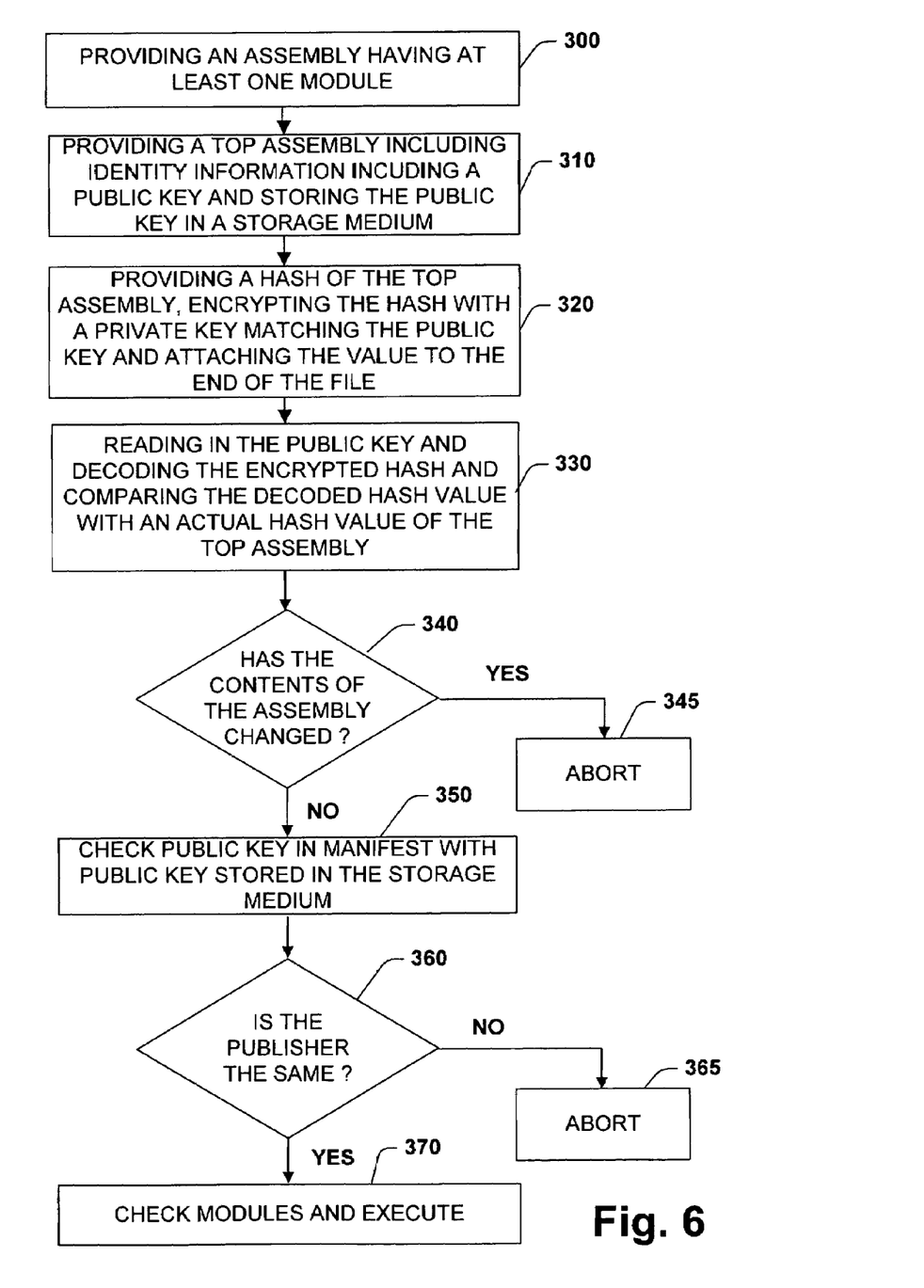
FIG. 6 illustrates a flow diagram of one particular methodology for facilitating the integrity of an assembly in accordance with one aspect of the present invention.

FIG. 6 illustrates one particular methodology for ensuring and verifying the integrity of an assembly having modules. In step 300, an assembly is provided having at least one module. In step 310, a top assembly of the assembly is provided with identity information including a public key and the public key is also stored in a storage medium. A hash of the entire file contents of the top assembly is provided, which is then encrypted using a private key that forms a key pair with the public key and the encrypted value is attached to the end of the assembly in step 320. The application program 232 and the assemblies employed by the application program can now be loaded into the cache 230 for execution. In step 330, the public key is read from the identity information of the top assembly and used to decode the encrypted hash, so that it can be compared to an actual hash value of the top assembly. In step 340, a determination of whether the contents of the assembly have changed is made. If the assembly has changed (YES), the application program aborts in step 345. If the assembly has not changed (NO), the public key in the manifest is compared with the public key stored in the storage medium in step 350. The public key can also be compared when a reference from one assembly to another is resolved. In step 360, a determination of whether the public keys match is made by the verification component 275. If the publisher is not the same or original publisher (no), the application program aborts in step 365. If the publisher is the same or original publisher (YES), the modules are hashed and the values checked with hashes stored in the identity information and the assembly executed in step 370.

Figure 7:
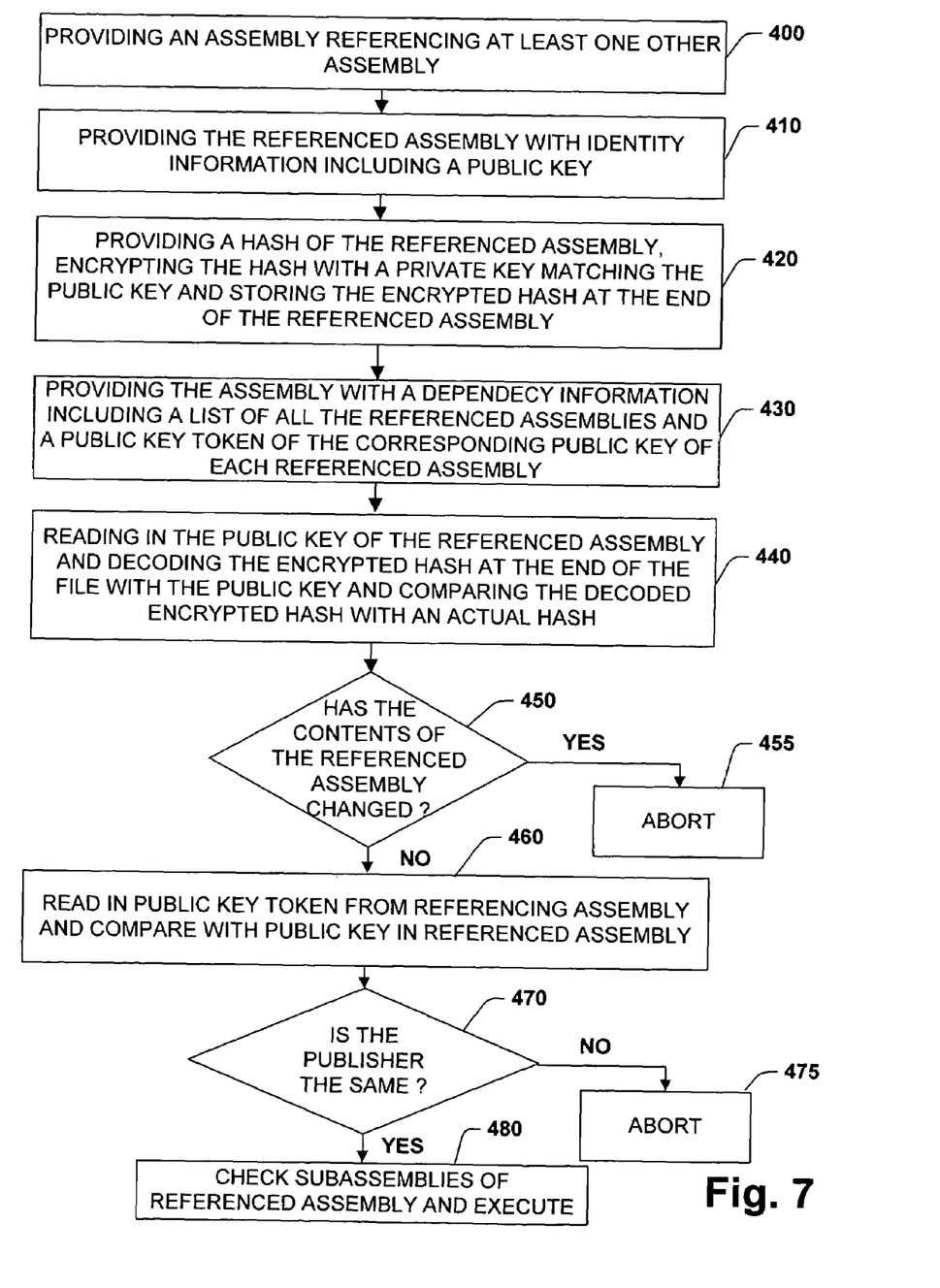
FIG. 7 illustrates a flow diagram of another methodology for facilitating the integrity of an assembly in accordance with one aspect of the present invention.

FIG. 7 illustrates one particular methodology for ensuring and verifying the integrity of assemblies referenced by other assemblies. In step 400, an assembly is provided that references at least one other assembly. In step 410, the referenced assembly is provided with identity information including a public key. A hash of the referenced assembly is provided and encrypted with a private key matching the public key, and the encrypted hash is attached at the end of the referenced assembly in step 420. In step 430, the assembly is provided with dependency information including a list of all the referenced assemblies and a public key token of the corresponding public key of each referenced assembly. The application program 232 and the assemblies employed by the application program can now be loaded into the cache 230 by the loader 250 for execution. In step 440, the public key of the reference assembly is read in and the encrypted hash decoded using the public key and the decoded encrypted hash compared with an actual hash run on the referenced assembly. In step 450, a determination of whether the contents of any referenced assembly has changed is made. If at least one of the referenced assemblies has changed (YES), the application program aborts in step 455. If none of the referenced assemblies have changed (NO), the public key token in the referencing assembly is compared with the public key in the referenced assembly in step 460. In step 470, a determination of whether the publisher of the referenced assemblies is the same or original publisher is made by the verification component 275. If the publisher is not the original publisher (NO), the application program aborts in step 475. If the publisher is the original publisher (YES), the modules of each referenced assembly are verified and the assemblies executed in step 470.

Figure 8A:
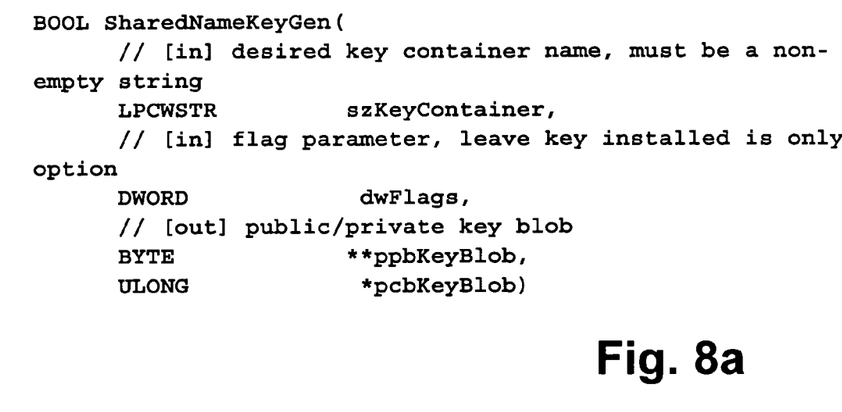
FIG. 8a illustrates an API for generating a key pair for shared name use in accordance with one aspect of the present invention.
Figure 8B:
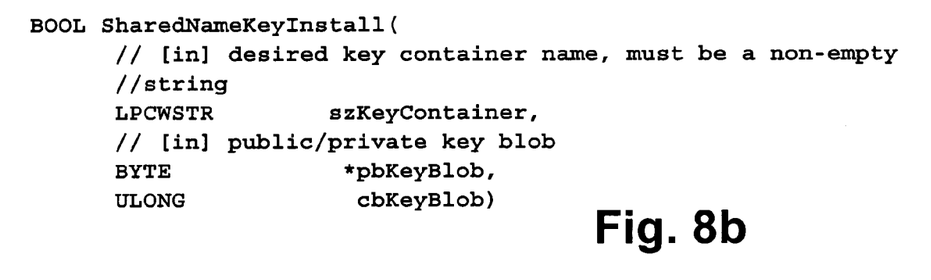
FIG. 8b illustrates an API for installing a key blob into a shared name CSP in accordance with one aspect of the present invention.
Figure 8C:
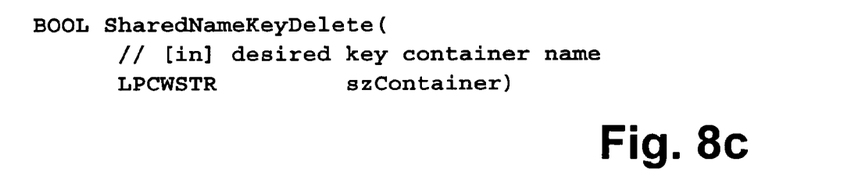
FIG. 8c illustrates an API for deleting a key pair from a CSP in accordance with one aspect of the present invention.
Figure 8D:
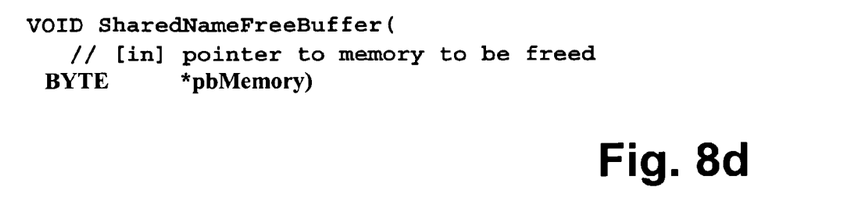
FIG. 8d illustrates an API for freeing memory allocated by shared name functions in accordance with one aspect of the present invention.
Figure 9A:
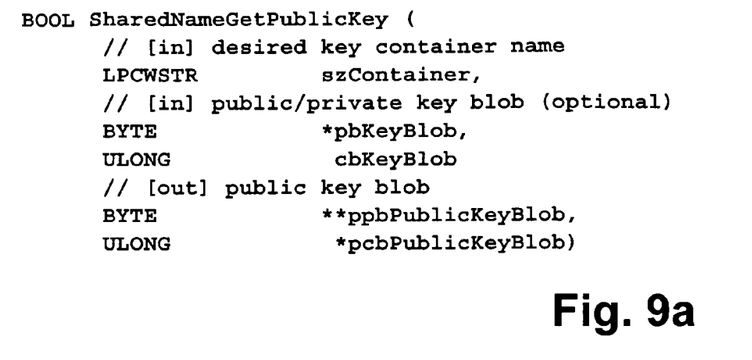
FIG. 9a illustrates an API for retrieving a public key blob in accordance with one aspect of the present invention.
Figure 9B:
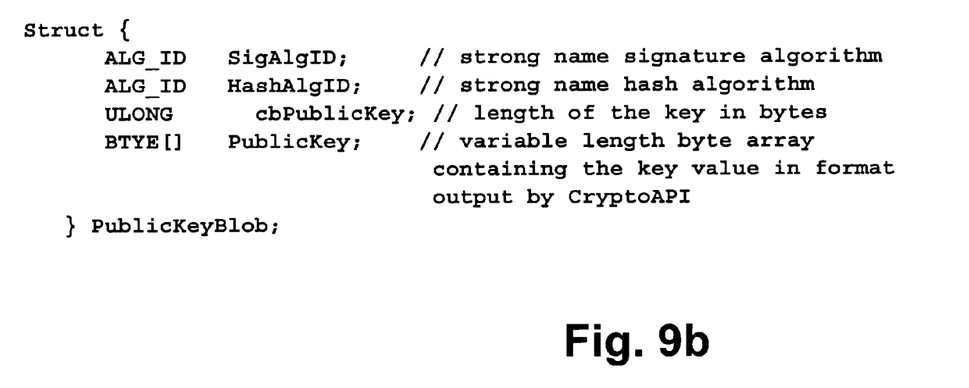
FIG. 9b illustrates a returned public key blob from the API illustrated in FIG. 9a in accordance with one aspect of the present invention.
Figure 9C:
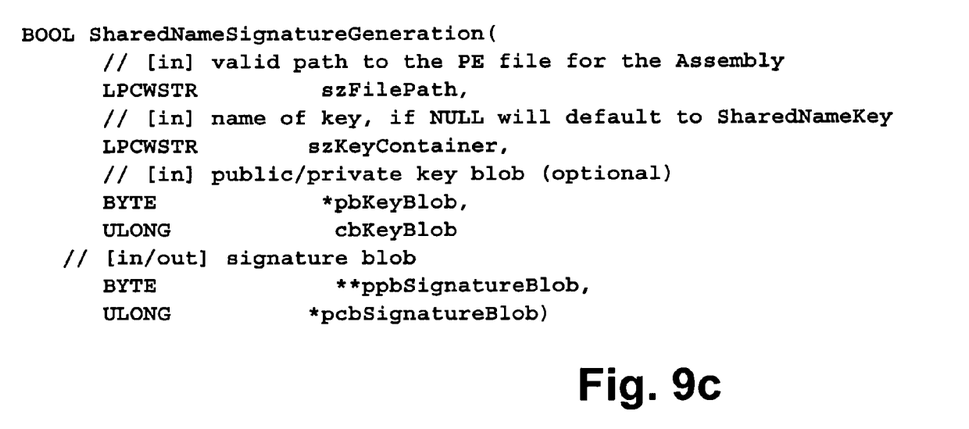
FIG. 9c illustrates an API for generating a digital signature in accordance with one aspect of the present invention.
Figure 10A:
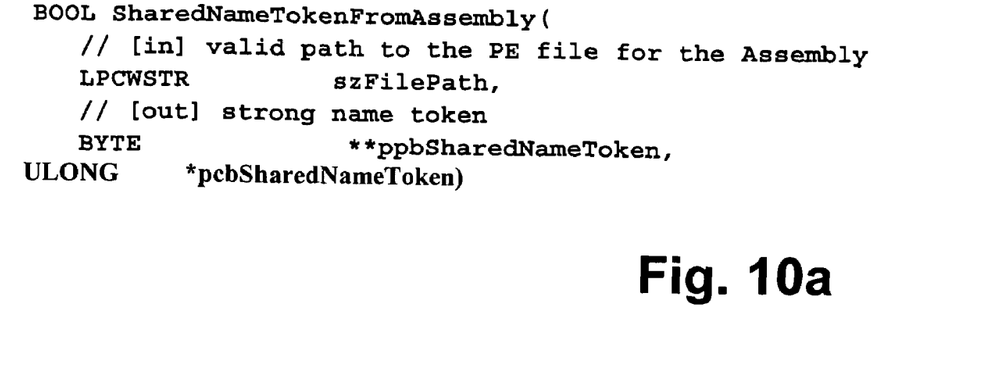
FIG. 10a illustrates an API for generating a token from a public key extracted from an assembly in accordance with one aspect of the present invention.
Figure 10B:
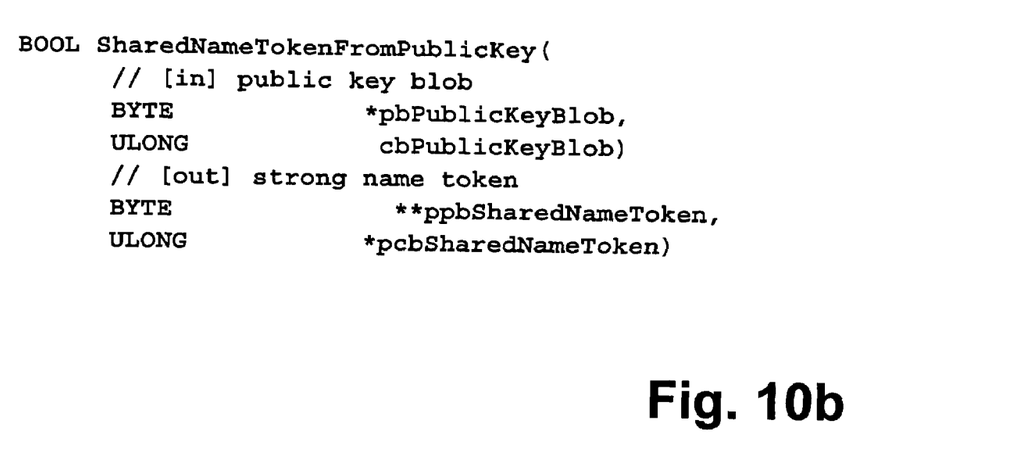
FIG. 10b illustrates an API for generating a token from a public key structure in accordance with one aspect of the present invention.
Figure 10C:
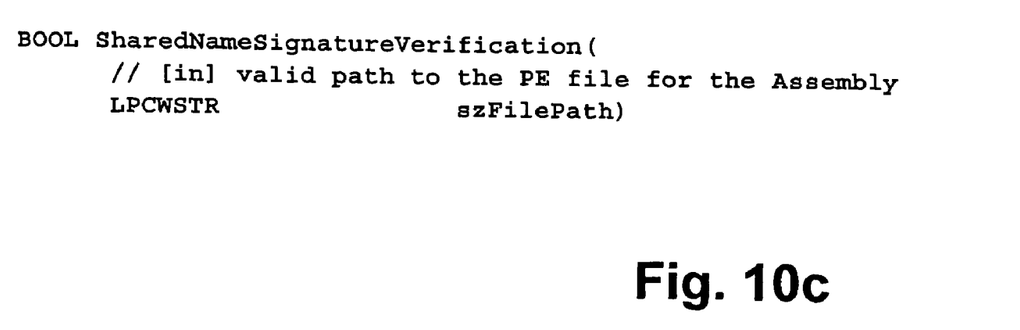
FIG. 10c illustrates an API for verifying a shared name signature in accordance with one aspect of the present invention.

FIGS. 8–10 describe simple APIs adapted to provide the necessary cryptographic functionality to facilitate implementation of Shared Names across tools, and the runtime. The present example removes much of the complexity associated with using Cryptographic Service Providers (CSPs), key management, and digital signature/verification operations. The present example of APIs also represents a set of APIs that may be ported to a variety of different platforms.

Shared Name generation requires support for public/private key pair generation, hashing, digital signature, and signature verification on development platforms. Runtime platforms only require hashing and signature verification. The APIs are factored to allow tailoring of support for development and runtime systems. The present example of APIs assume implementation of a pre-designated CSP for all crypto operations (e.g., "Microsoft Base Cryptographic Provider v1.0"), the RSA signature algorithm and the SHA-1 hash algorithm. The CryptoAPI functions can be provided as unmanaged C-code interfaces with function returning TRUE if successful, or FALSE if an error occurs.

The present example of APIs can support key generation and management by compiler vendors. The present example of APIs are designed to provide the flexibility needed to address common development scenarios while still being easy to use. Using these APIs, it is possible for compilers to Generate Shared Name cryptographic key pairs and retrieve a representation (portable key blob) that can be easily stored and moved across development platforms. It is also possible to associate a Shared Name key cryptographic pair with a project and use it for Shared Name generation. The key pair need not be permanently installed into the Cyptographic Service Provider (CSP) used for Shared Name generation so that use of distinct key pairs for each project can be easily accommodated. In addition, the example APIs provides assurance that Shared Name key operations will not impact the use of cryptographic functionality by other applications on the user's machine.

FIG. 8a illustrates a function for creating a new key pair for Shared Name use and exporting the key pair to a calling program. A container name is a user defined string. The function allows a user to defined names so that multiple Shared Name keypairs (e.g., project1 vs project2, test vs deploy) can be managed. The dwFlags parameter is used to control optional actions. The only defined flag for this version is SN_LEAVE_KEY (value is 1). If set, then the key pair will be left installed in the Shared Name CSP. The function in FIG. 8a can attempt to create a new signing key pair using the supplied container name prefixed by "SNK". The SNK prefix will not be visible to the calling application and is used to provide good assurance that a supplied container name will not clash with one used by a different application. Alternate prefixes may be employed without departing from the scope of the invention. The generated key will be marked exportable (if supported by the CSP) and the public/private keys exported in an unencrypted keyblob. This is returned to the caller. The keyblob may be stored in any way convenient for the calling application. If modified, it will no longer be usable.

FIG. 8b illustrates a function that may be used to install a portable key blob into a machine CSP. Its purpose is to support installation of default Shared Name keys. This function attempts to install the key pair provided in the key blob into the Shared Name CSP using the provided container name. As noted above, the container name can be transparently prefixed by "SNK" to minimize the possibility of collisions with other applications keys. If the container name already exists or an invalid key blob is supplied, an error is returned.

FIG. 8c illustrates a function that may be used to delete a Shared Name key pair from the CSP. This will only be required if the SN_LEAVE_KEY option was selected at key generation time, or the key was subsequently installed into the CSP. This function will acquire the Shared Name CSP context for the given key container name with the flag CRYPT_DELETEKEYSET. The supplied container name can be prefixed with "SNK" prior to this operation to avoid potential name clashes with other applications. FIG. 8d illustrates a function employed to free memory allocated by the shared name function illustrated in FIG. 8a.

In securely defining a Shared Name namespace, the portable executable (PE) file containing the Assembly metadata is signed with the private key corresponding to the public key that defines the namespace. The development environment can perform the operation required in generating a Shared Name. First, the Shared Name public key blob is retrieved. Space is reserved in the metadata section to hold the key blob and it is inserted. Optionally, the Shared Name public key blob can be stored by the project system so that it can be used when creating references in other assemblies. Secondly, the size of the Shared Name signature blob is retrieved. Space is allocated in the PE file to hold the signature. The PE file can then be saved to disk. The Shared Name signature blob can then be generated. The calling program will provide the name of the PE file and the Shared Name keys to use. The signature function will compute the signature and, optionally, insert it into the defined section in the PE file. FIGS. 9a–9c illustrate APIs that support the above described operations. In each function, the Shared Name key pair may be provided as a portable key blob, or a container name reference to a key pair already installed in the Shared Name CSP. The Shared Name CSP, hash algorithm, and signing algorithms can be based on default machine settings.

FIG. 9a illustrates a method of supporting retrieval of a public key blob. This function will attempt to acquire the Shared Name CSP context with the provided szContainer name. As with the previously described APIs, the container name will be silently prefixed with "SNK". If pbKeyBlob is NULL, then it is assumed the key pair is already installed in the CSP so the container must exist and it must contain a public key pair associated with a signing algorithm. If pbKeyBlob is non-NULL, then the CSP is acquired with CRYPT_NEWKEYSET. In this case, an error is returned if the container name exists. If the CSP is acquired successfully, then the key pair in key blob can be imported. In this case, the key pair will be deleted before the function returns. FIG. 9b illustrates an encoded returned PublicKeyBlob.

FIG. 9c illustrates an API that supports signature operations. It can be used to retrieve the size of signature blob so that space in the PE file can be allocated. It can then be used to generate the signature. The function can optionally write the signature directly into the PE file or return the signature blob to the caller. This function will attempt to acquire the Shared Name CSP context with the provided szContainer name. As previously discussed, the container name can be silented prefixed with "SNK". If pbKeyBlob is NULL, then it is assumed the key pair is already installed in the CSP, so the container already exists and it contains a public key pair associated with a signing algorithm. If pbKeyBlob is non-NULL, then the CSP is acquired with CRYPT_NEWKEYSET. In this case, the container name should not exist. If the CSP is acquired successfully, then the key pair in key blob will be imported. In this case, the key pair will be deleted before the function returns. If szFilePath is NULL, it indicates that only the size of the signature blob should be returned. This is returned in the location pointed at by *pcbSignatureBlob. If szFilePath is non_NULL, then the PE file is hashed and the hash is signed using the private key. If ppbSignatureBlob is NULL, this function will insert the signature blob into a reserved section in the PE and perform any required PE fix-ups (e.g., CRC). If the caller wishes to handle the signature blob and its insertion into the PE file, then ppbSignatureBlob should be a valid pointer to a pointer variable.

FIGS. 10a–10c illustrate the creation of a fixed size "token" to refer to a Shared Name namespace and to do signature validation. This is computed using a hash function from the public key associated with the namespace. This hash operation is used to reduce the size of the token relative to the key size, provide high assurance of a unique token (statistically unique) and make it extremely difficult to forge a Shared Name. The SHA-1 hash function has the desired properties and is readily available since we assume its use in generating the Shared Name. A drawback to SHA-1 is that it generates a 160-bit value. This is much smaller than typical RSA signature keys (512 bits or larger), but is larger than the key size typically used for some other algorithms such as ECC. To reduce the size of the token, the low-order 64-bits of the SHA-1 hash will be used as the token value. FIG. 10a illustrates a function for creation of a token where the public key blob is extracted from the referenced Assembly manifest in a PE file (the PublicKeyBlob structure in the metadata). FIG. 10b illustrates a function where it is desirable to generate the token from a public key blob structure.

FIG. 10c illustrates a function for verifying a by using the Shared Name public key to verify the Shared Name signature blob. This operation requires a reference to the PE file containing the Assembly manifest. If this function returns TRUE, then the signature is verified, otherwise it returns FALSE and the Shared Name should not be respected. SzFilePath should be valid reference to a PE file and it should contain, a PublicKeyBlob structure in the metadata and a Shared Name signature blob in the section of the PE file reserved for this purpose. The function computes the hash of the PE file using the same algorithm used in SharedNameSignatureGeneration( ).

Verification involves operations on the hash, the signature, and public key that depend upon the algorithm being used. Tools assign Shared Names to assemblies using the crypto helper API's and the assembly metadata API's. References to assemblies with Shared Names (AssemblyRefs) contain a "token" that represents the public key used to generate the Shared Name in the referenced assembly. This token is used at bind time to help locate the desired assembly.

The Shared Name signatures can be verified by runtime when the assembly is placed in the local assembly cache. Since verification is done at cache-load time, binding to an assembly with a Shared Name only requires a key equivalence check. The Shared Name token recorded as part of the referenced can be included in the cache lookup. Alternatively, the signature can be verified at load time if there is a defined code access security policy defined on the shared name for that particular key.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A method for facilitating a secured name space for an assembly employable by application programs during runtime, comprising the steps of:
   providing a key pair having a public key and a private key;
   providing the assembly with a manifest that contains the public key;
   hashing the assembly;
   encrypting the hash of the assembly with the private key;
   relating the encrypted hash to the assembly; and
   referencing the assembly with a manifest of a referencing assembly that contains a token of the public key that is computed by a hash function, the assembly is referenced by comparing the token of the public key in the manifest of the referencing assembly with the public key contained in the manifest of the assembly.

2. The method of claim 1, further comprising the step of determining if the contents of the assembly has been modified by decoding the encrypted hash value with the public key, determining an actual hash of the contents of the assembly and comparing the decoded encrypted hash with the actual hash.

3. The method of claim 2, further comprising the step of determining if the publisher of the assembly is the owner of the private key.

4. The method of claim 1, further comprising the step of determining if the contents of the assembly has been modified by decoding the encrypted hash value with the public key, determining an actual hash of the contents of the assembly and comparing the decoded encrypted hash with the actual hash.

5. The method of claim 4, further comprising the step of determining if the publisher of the assembly is the original owner of the key pair.

6. The method of claim 5, the step of determining if the publisher of the assembly is the original owner of the key pair comprising the step of storing the public key in a storage medium and comparing the public key in the storage medium with the public key in the manifest.

7. A computer readable medium having at least one computer executable component employable by an application program at runtime comprising:
   an assembly including a manifest that contains a public key and a hash of the contents of the assembly encrypted by a private key, the private key and the public key forming a key pair, the encrypted hash being referenced to the assembly, and a referencing assembly that references the assembly, the referencing assembly including a manifest that contains a token of the public key of the assembly, the assembly is referenced by comparing the public key contained in the manifest of the assembly with the token of the public key that is contained in the manifest of the referencing assembly.

8. The computer readable medium of claim 7, the assembly being a dynamically linked library.

9. A system for facilitating secured name spaces of assemblies employable by application programs at runtime, the system comprising:
   a first component adapted to provide a manifest within an assembly with a public key;
   a second component adapted to hash the contents of the assembly and encrypt the hash with a private key matching the public key;
   a third component that uses a hash function to compute a token of the public key associated with the manifest, the token is contained in a manifest of a referencing assembly; and
   a fourth component that references the assembly by comparing the public key in the manifest of the assembly with the token of the public key that is contained in the manifest of the referencing assembly.

10. The system of claim 9, further comprising a verification component adapted to decode the encrypted hash with the public key and compare the decoded encrypted hash with an actual hash run on the assembly.

11. The system of claim 9, further comprising a key pair generating component adapted to generate a key pair.

12. The system of claim 9, further comprising a binding component adapted to provide binding policy information for determining a version of an assembly that an application program will run if another assembly having the same name resides on the system.

13. The system of claim 9, further comprising a verification component adapted to decode the encrypted hash with the public key and compare the decoded encrypted hash with an actual hash run on the assembly.

14. A system for facilitating a secured name space of an assembly employable by application programs at runtime, the system comprising:
   means for providing a key pair having a public key and a private key;
   means for inserting a public key in a manifest of an assembly;
   means for hashing the assembly;
   means for encrypting the hash of the assembly with the private key;
   means for relating the encrypted hash to the assembly;
   means for hashing the public key;
   means for inserting a token of the public key into a manifest of a referencing assembly that references the assembly; and
   means for comparing the token of the public key in the manifest of the referencing assembly with the public key in the manifest of the assembly.

15. The system of claim 14, further comprising means for determining if the assembly has been modified.

16. The system of claim 15, the means for determining if the assembly has been modified including means for decoding the encrypted hash with the public key, means for generating an actual hash value and means for comparing the generated hash value with the decoded encrypted hash value.

17. The system of claim 14, at least one of the assembly and referencing assembly being a dynamically linked library.

* * * * *